United States Patent [19]

Huang

[11] Patent Number: 5,042,051
[45] Date of Patent: Aug. 20, 1991

[54] APPARATUS FOR TRANSMITTING AND RECEIVING MANCHESTER CODED DIGITAL DATA FOR IEEE 802.3 ETHERNET/CHEAPERNET TYPE LOCAL AREA NETWORK

[75] Inventor: Mark Po-Shaw Huang, Taipei, Taiwan

[73] Assignee: Tamarack Microelectronics Inc., Taipei, Taiwan

[21] Appl. No.: 525,008

[22] Filed: May 18, 1990

[51] Int. Cl.⁵ ............................................. H04B 1/38
[52] U.S. Cl. ......................................... 375/7; 375/55; 375/76
[58] Field of Search ................................ 375/7, 36, 76; 370/85.2, 85.3; 340/825.5; 455/58

[56] References Cited

U.S. PATENT DOCUMENTS

| | | | |
|---|---|---|---|
| 3,721,958 | 3/1973 | Dixon | 375/7 |
| 4,384,363 | 5/1983 | Lipcon | 455/58 |
| 4,479,228 | 10/1984 | Crane | 375/7 |
| 4,494,244 | 1/1985 | Arndt et al. | 455/58 |
| 4,649,548 | 3/1987 | Crane | 455/58 |
| 4,896,349 | 1/1990 | Kubo et al. | 375/36 |

Primary Examiner—Benedict V. Safourek
Assistant Examiner—Young Tse
Attorney, Agent, or Firm—Varndell Legal Group

[57] ABSTRACT

The present invention relates to an apparatus for transmitting and receiving Manchester coded digital data for IEEE 802.3 Ethernet/Cheapernet type local area network. The apparatus mainly comprises, an isolation transformer, a signal converter with one end connected to one side of the isolation transformer, a receiver with its input connected to the other end of the signal converter, a capacitor located in the receiver and a transmitter with its output connected to the other side of the isolation transformer whereby the isolation transformer and the capacitor may isolate the external terminals from the main circuit. Moreover, the receiver and the transmitter can be integrally formed with a controller and thus to reduce the cost.

21 Claims, 9 Drawing Sheets

APPARATUS FOR TRANSMITTING AND RECEIVING MANCHESTER CODED DIGITAL DATA FOR IEEE 802.3 ETHERNET/CHEAPERNET TYPE LOCAL AREA NETWORK

BACKGROUND OF THE INVENTION

The present invention relates to an apparatus for transmitting and receiving digital data, and more particularly to an apparatus for transmitting and receiving Manchester coded digital data for IEEE 802.3 Ethernet/Cheapernet type local area network.

As shown in FIG. 1, conventional transmitting and receiving apparatus in general utilize an isolated power supply 81 and a pulse transformer 82 to isolate both CS and CC terminals from the main circuit. However, the isolated power supply 81 and the pulse transformer 82 are quite bulky and expensive. Also, the total power consumption caused by the isolated power supply 81 is very significant. Moreover, in conventional apparatus, as shown in FIG. 1, a receiver 83 and a transmitter 84 are separated from a controller 85 by the isolated power supply 81 and the pulse transformer 82 such that both the receiver 83 and the transmitter 84 cannot be integrally formed with the controller 85 to produce a single chip. Therefore, the cost thus incurred cannot be reduced.

It is, therefore, the object of the present invention to obviate and mitigate the aforesaid drawbacks.

SUMMARY OF THE INVENTION

It is the object of the present invention to provide an apparatus for transmitting and receiving digital data which comprises an isolation transformer, a signal converter with one end connected to one side of the isolation transformer, a receiver with its input connected to the other end of the signal converter, a capacitor located in the receiver and a transmitter with its output connected to the other side of the isolation transformer whereby the isolation transformer and the capacitor may isolate the external terminals from the main circuit and the receiver together with the transmitter can be integrally formed with a controller to produce a single chip and thus to reduce the cost.

It is another object of the present invention to provide an apparatus for transmitting and receiving digital data which substitutes an isolation transformer and a capacitor for the commonly used isolated power supply and pulse transformer which are quite bulky and expensive, so as to lower the production cost.

It is a further object of the present invention to provide an apparatus for transmitting and receiving digital data which can reduce the power consumption due to the omission of the commonly used isolated power supply.

BRIEF DESCRIPTION OF THE DRAWINGS

FIG. 2-1 and 2-2 are respectively the simplified overall block diagram and detailed overall block diagram illustrating a preferred embodiment of the present invention;

FIG. 3-1 and 3-2 are respectively the simplified block diagram and the detailed circuit diagram of a receiver in accordance with the present invention;

DETAILED DESCRIPTION OF THE PREFERRED EMBODIMENT

Figure 1:
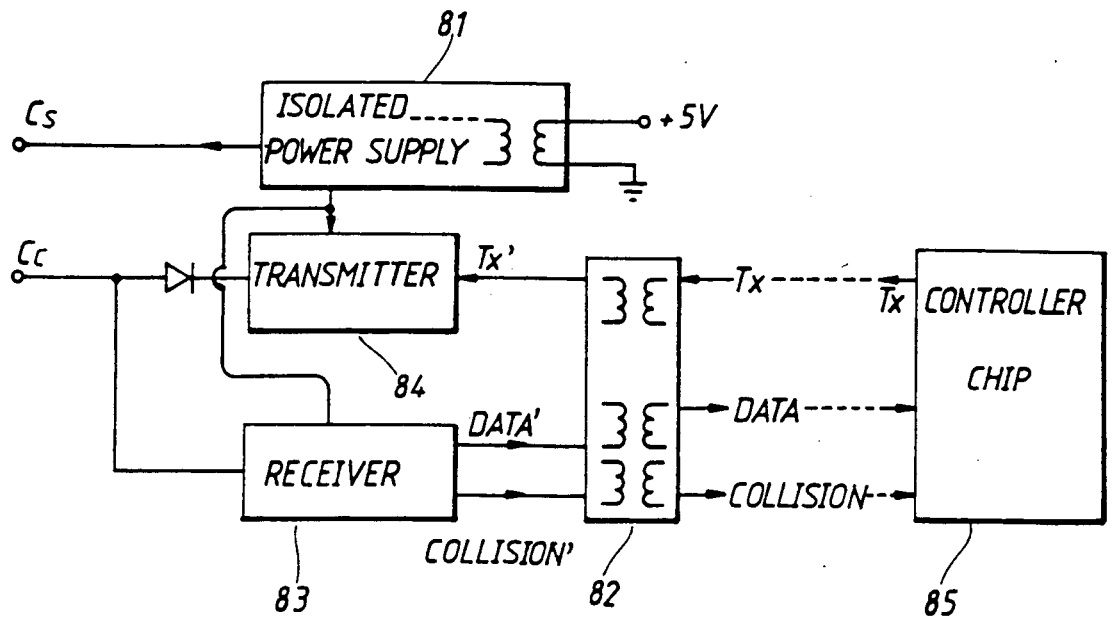
FIG. 1 is a schematic block diagram showing a prior art apparatus.
Figures 1, 2:
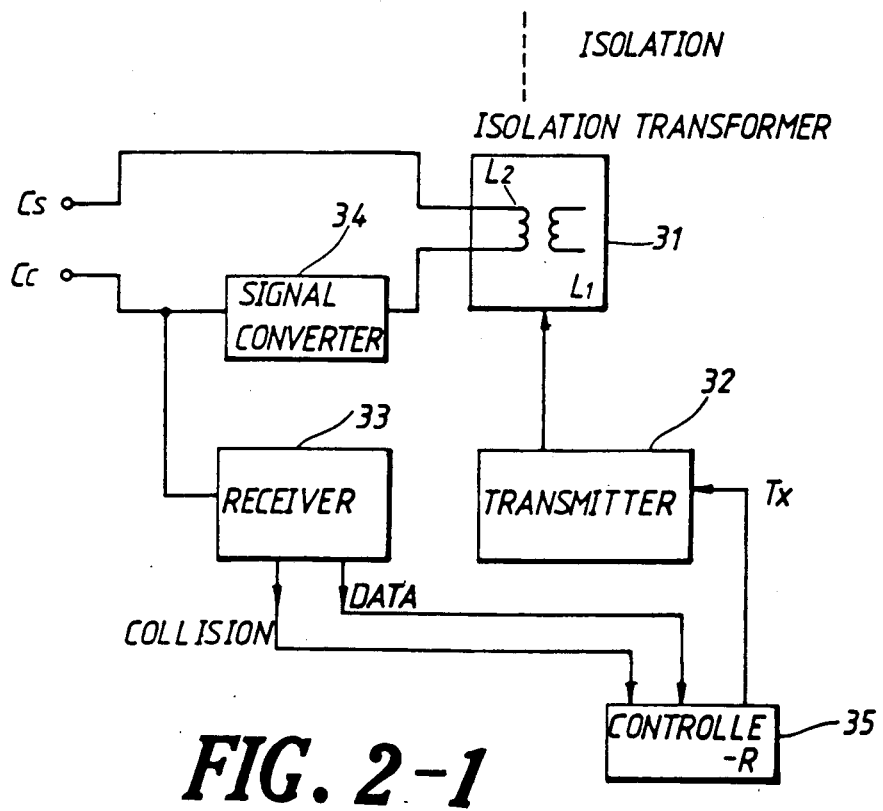
Figure 2:
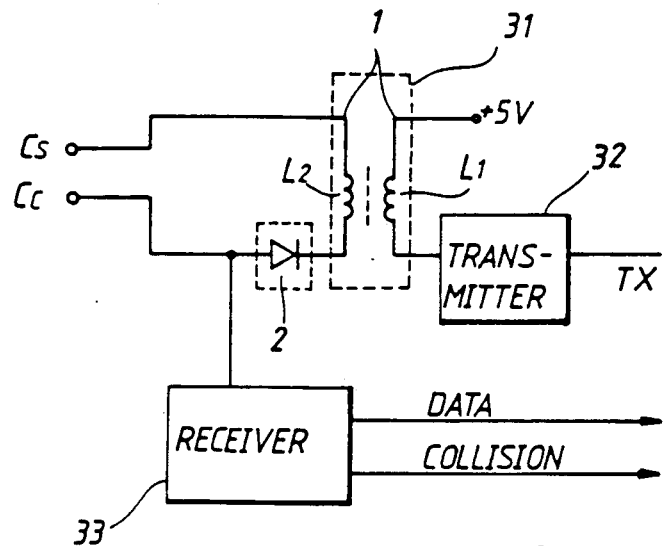

Referring to FIGS. 2-1 and 2-2, a preferred embodiment of the present invention mainly comprises an isolation transformer 31, a transmitter 32, a receiver 33 and a signal converter 34 wherein the signal converter 34 is connected at one end to a second coil L2 of the isolation transformer 31 and an input of the receiver 33 is connected to the other end of the signal converter 34 while two outputs thereof are respectively connected to terminals DATA and COLLISION both of which are fed to a controller 35. Furthermore, an output of the transmitter 32 is connected to a first coil L1 of the isolation transformer 31 and an input thereof is connected to a terminal TX which serves as an output of the controller 35. The other end of the second coil L2 is connected to a terminal cs. The input of the receiver 33 also is connected to a terminal cc. As shown in FIG. 2-2, in a preferred embodiment, the signal converter 34 may be a diode 2 with its anode connected to the input of the receiver 33 and its cathode connected to said one end of the second coil L2.

Figures 2, 3:
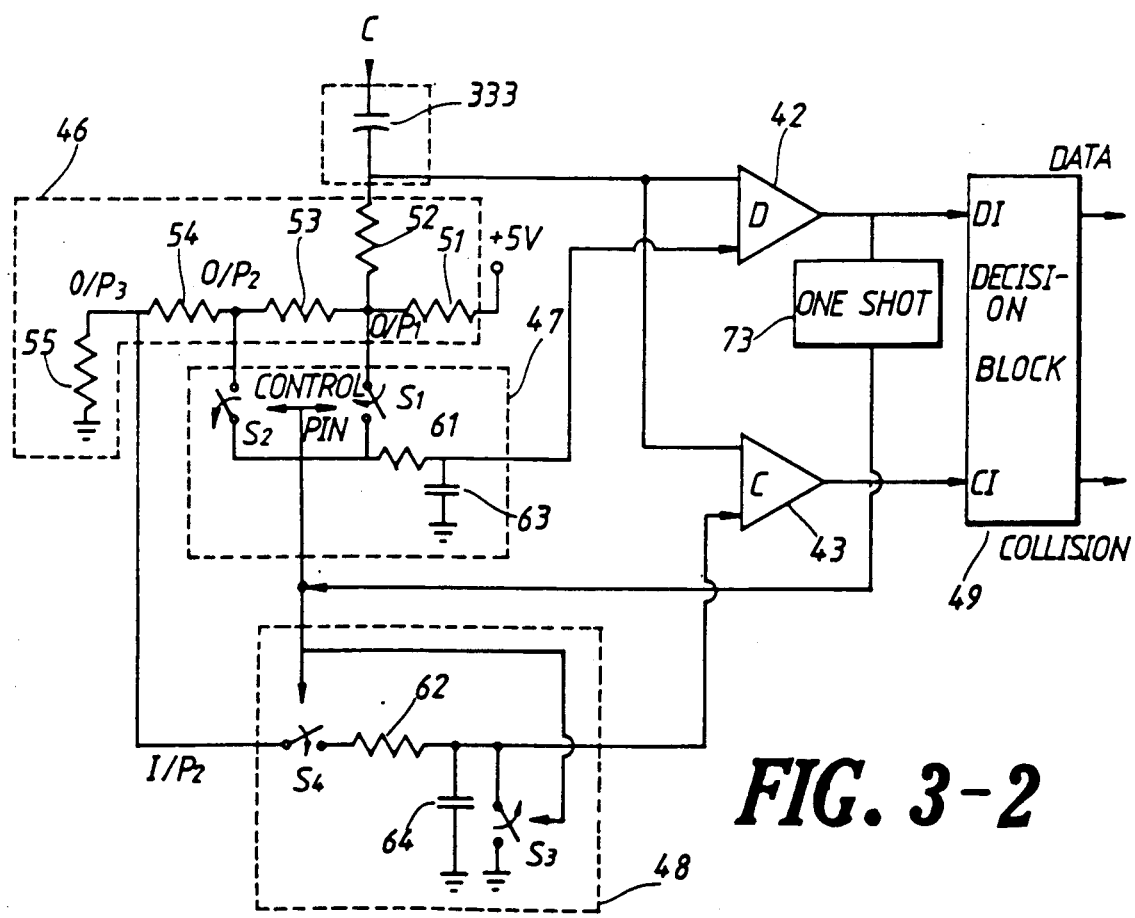
Figures 1, 3:
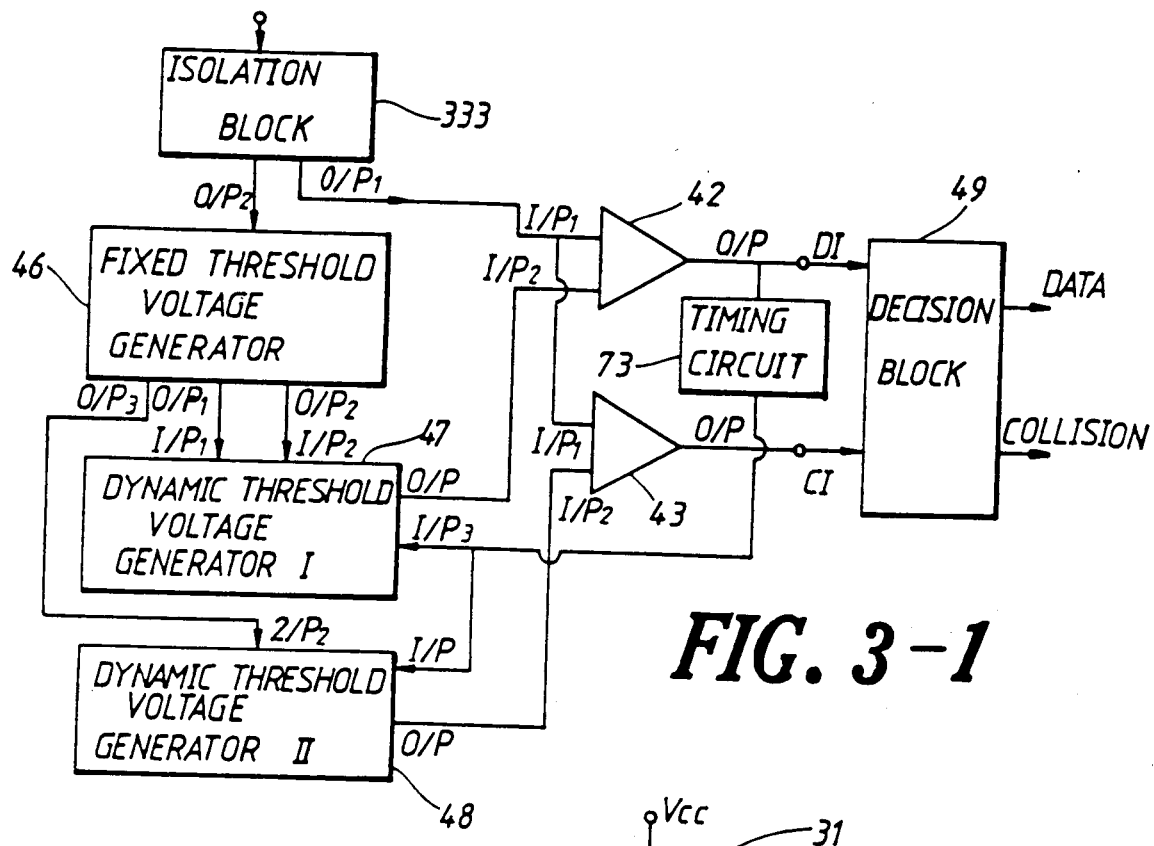

As shown in FIG. 3-1, the receiver 33 comprises an isolation block 333 which, for example, can be a capacitor. A second output O/P2 of said isolation block 333 is fed into a fixed threshold voltage generator 46. A first and a second outputs O/P1 and O/P2 of the fixed threshold voltage generator 46 are respectively fed into a first and a second inputs I/P1 and I/P2 of a first dynamic threshold voltage generator 47 and a third output O/P3 thereof is fed into a second input I/P2 of a second dynamic threshold voltage generator 48. A first output O/P1 of the isolation block 333 is connected both to a first input I/P1 of a first comparator 42 and to a first input I/P1 of a second comparator 43. The output of the first dynamic threshold voltage generator 47 is fed into a second input I/P2 of the first comparator 42 and the output of the second dynamic threshold voltage generator 48 is fed into a second input I/P2 of the second comparator 43. The output of the first comparator 42 is connected both to a terminal DI of a decision block 49 and to the input of a timing circuit 73 and the output of the second comparator 43 is connected to a terminal CI of the decision block 49. The output of the timing circuit 73 is fed both to a third input I/P3 of the first dynamic threshold voltage generator 47 and to a first input I/P1 of the second dynamic threshold voltage generator 48. The decision block 49 has a DATA output and a COLLISION output.

As shown in FIG. 3-2, the fixed threshold voltage generator 46 comprises a first resistor 51 having one end connected to a positive power supply (such as 5 V) and the other end connected to the connection node of a second resistor 52 and a third resistor 53. The other end of the second resistor 52 is connected to the second output O/P2 of the isolation block 333. The third resistor 53 is connected in series with a fourth resistor 54 and a fifth resistor 55. Referring to FIGS. 3-1 and 3-2, the first output O/P1 of the fixed threshold voltage generator 46 is the connection node of the first and second resistors 51 and 52, the second output O/P2 thereof is the connection node of the third and fourth resistors 53 and 54, and the third output O/P3 thereof is the connection node of the fourth and fifth resistors 54 and 55.

As shown in FIG. 3-2, the first dynamic threshold voltage generator 47 comprises a first switch S1 having one end connected to the first output O/P1 of the fixed threshold voltage generator 46, and the other end connected to a sixth resistor 61. A second switch S2 has one end connected to the second output O/P2 of the fixed threshold voltage generator 46 and the other end connected to said one end of said sixth resistor 61. The control pins of said switches S1 and S2 are connected to the output of the timing circuit 73 such that the output signal coming from the output of the timing circuit 73 may turn on the first switch S1 and disable the second switch S2, or vice versa. A first capacitor 63 is connected between the other end of said sixth resistor 61 and the ground. The connection node of the sixth resistor 61 and the first capacitor 63 is connected to the second input I/P2 of the first comparator 42.

As shown in FIG. 3-2, the second dynamic threshold voltage generator 48 comprises a third switch S3 which is connected between the second input I/P2 of the second comparator 43 and the ground. A second capacitor 64 is connected in parallel with the third switch 53. A seventh resistor 62 is connected between the second input I/P2 of the second comparator 43 and one end of a fourth switch S4. The other end of the fourth switch S4 is connected to the third output O/P3 of the fixed threshold voltage generator 46. The signal coming from the output of the timing circuit 73 is arranged to turn on the third switch S3 and turn off the fourth switch S4, or vice versa. Also, it is noted that the timing circuit 73 can be a one-shot circuit as shown in FIG. 3-2.

Figure 4:
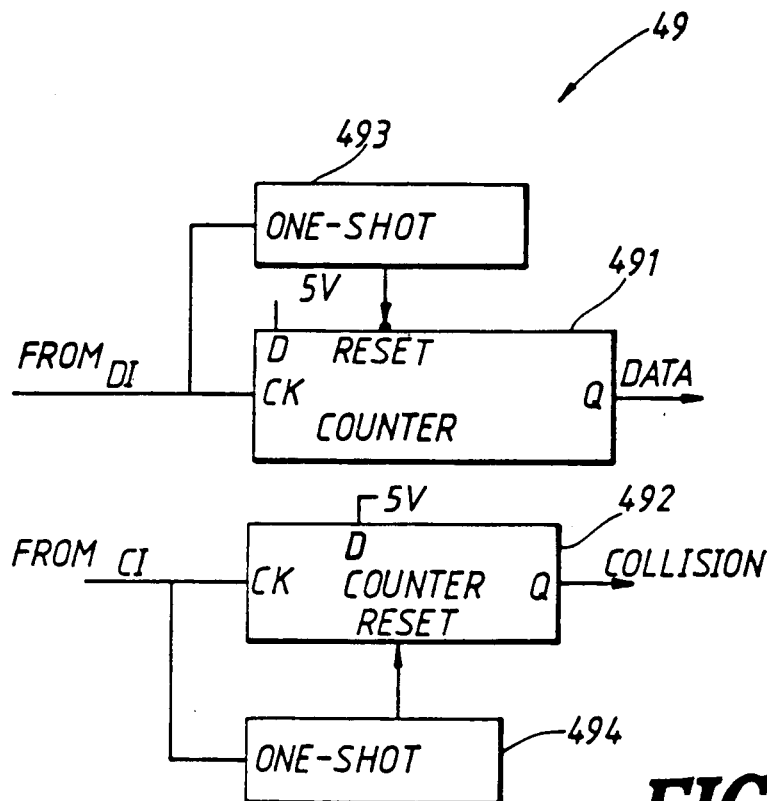
FIG. 4 is a schematic block diagram showing a first embodiment of a decision block in accordance with the present invention.

As shown in FIG. 4, the decision block 49 mainly comprises a first counter 491 and a second counter 492. The first counter 491 has an input ck coming from the terminal DI and an output Q to the terminal DATA while the second counter 492 has an input ck from the terminal CI and an output Q to the terminal COLLISION. A first one-shot means 493 is connected at its input to the input ck of the first counter 491 and at its output to a reset terminal of the first counter 491. Similarly, a second one-shot means 494 is connected at its input to the input ck of the second counter 492 and at its output to a reset terminal of the second counter 492. The DATA inputs of both counters 491 and 492 are tied to a positive power supply (such as 5 V).

Figure 5:
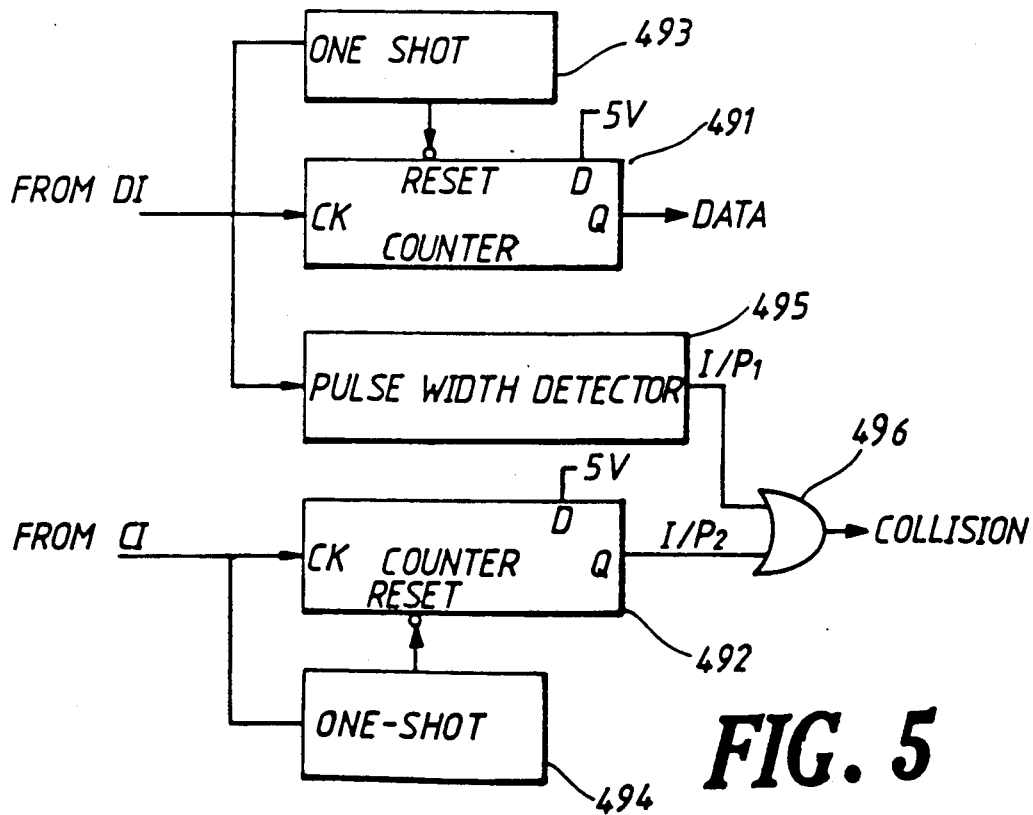
FIG. 5 is a schematic block diagram showing an alternative embodiment of the decision block as shown in FIG. 4.

An alternative embodiment of the decision block 49 is illustrated in FIG. 5. The differences between FIG. 4 and FIG. 5 reside in that a pulse width detector 495 is connected between the input ck of the first counter 491 and a first input I/P1 of a OR gate 496. The output of the second counter 492 is connected to a second input of the OR gate 496. The output of the OR gate 496 is connected to the terminal COLLISION.

Figure 6:
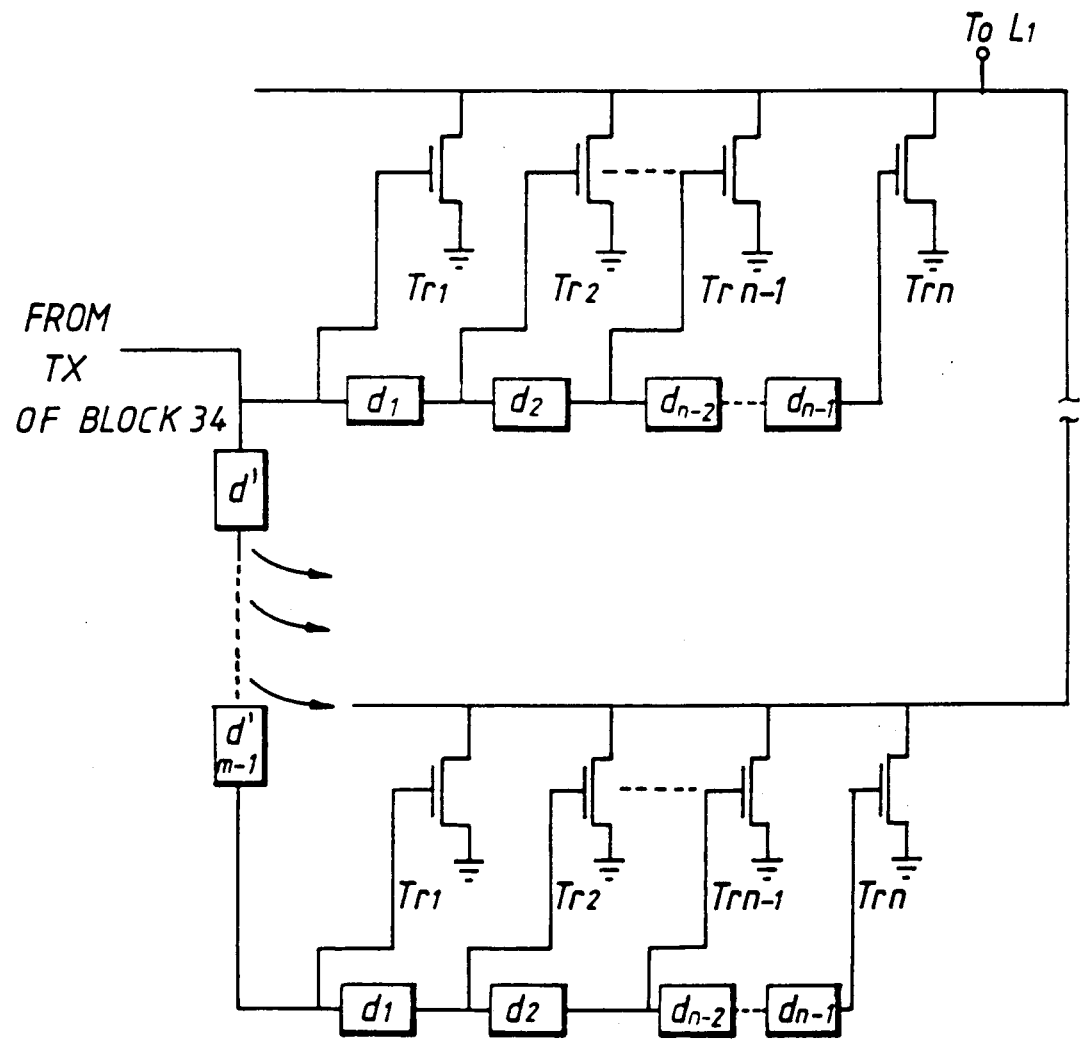
FIG. 6 is a schematic circuit diagram showing a first embodiment of a transmitter in accordance with the present invention.

Referring to FIGS. 2-2 and 6, the transmitter 32 comprises M sets of transistors wherein each set consists of N transistors tr1 to trn. All of the drains of N transistors tr1 to trn are connected to one end of the first coil L1 of the isolation transformer 31. The other end of the first coil L1 is connected to a power supply, such as 5 V as shown in FIG. 2-2. All of the sources of N transistors tr1 to trn are connected to ground. There are M chains of delay elements wherein each chain consists of (N−1) delay elements d1 to dn−1 which are connected in series with each other and cooperate with each set of N transistors tr1 to trn. That is, the input of the first delay element d1 of the first chain comes from the terminal TX and is connected to the gate of the first transistor tr1 of the first set and the outputs of the delay elements d1 to dn−1 of the first chain are sequentially connected to the gates of the transistors tr2 to trn of the first set. Such procedures are repeated until the Mth set of transistors have combined with the Mth chain of delay elements. Also, there are (M−1) delay components d1 to dm−1 which are connected in series to each other such that the input of the first delay component d1 comes from the terminal TX and is connected to the input of the first delay element d1 of the first chain. The outputs of the delay components d1 to dm−1 are sequentially connected to the first inputs of the first delay elments d1 of the second to Mth chains.

Figure 7:
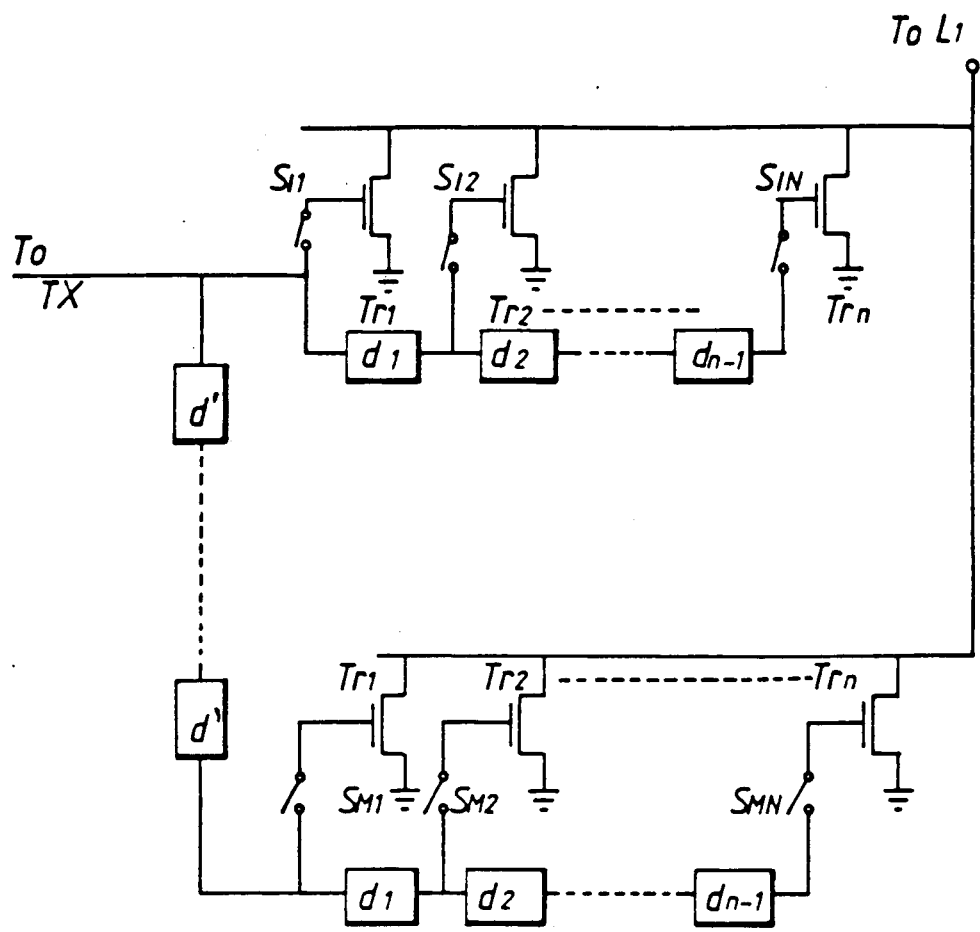
FIGS. 7 and 7A are schematic circuit diagrams showing a second embodiment of the transmitter as shown in FIG. 6.
Figure 7A:
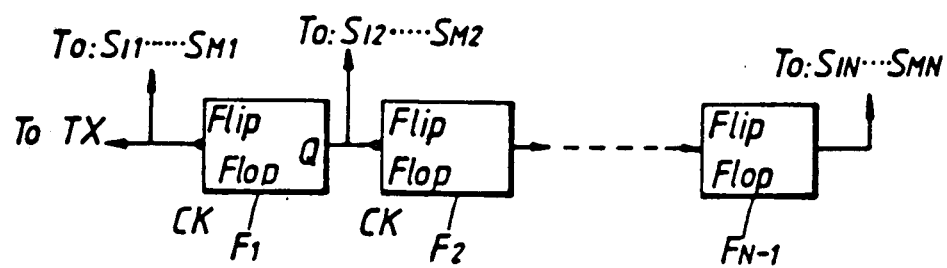

As shown in FIG. 7, regarding the first set of transistors tr1 to trn and the first chain of delay elements d1 to dn−1, a switch S11 is connected between the gate of the first transistor tr1 and the input of the first delay element d1 while each of the (N−1) switches S12 to S1n is sequentially connected between the gate of each of transistors tr2 to trn and the output of each delay elements do to dn−1. Such procedures will be repeated for the remaining (M−1) sets of transistors and the remaining (M−1) chains of delay elements. Furthermore, as shown in FIG. 7A a Flop-Flop chain consisting of (N−1) Flip-Flops f1 to fn−1 are connected in series with each other to form a shift register. The input of the first Flop-Flop f1 is connected both to terminal TX and to the control pins of the first switches s11 to M1 for M sets of switches. The output of the first Flop-Flop f1 is simultaneously connected to the control pins of the second switches S12 to SM2 for M sets of switches and similar procedures are applied to the remaining Flop-Flops f2 to fn−1 and the corresponding switches S12 to SMN.

Figure 8:
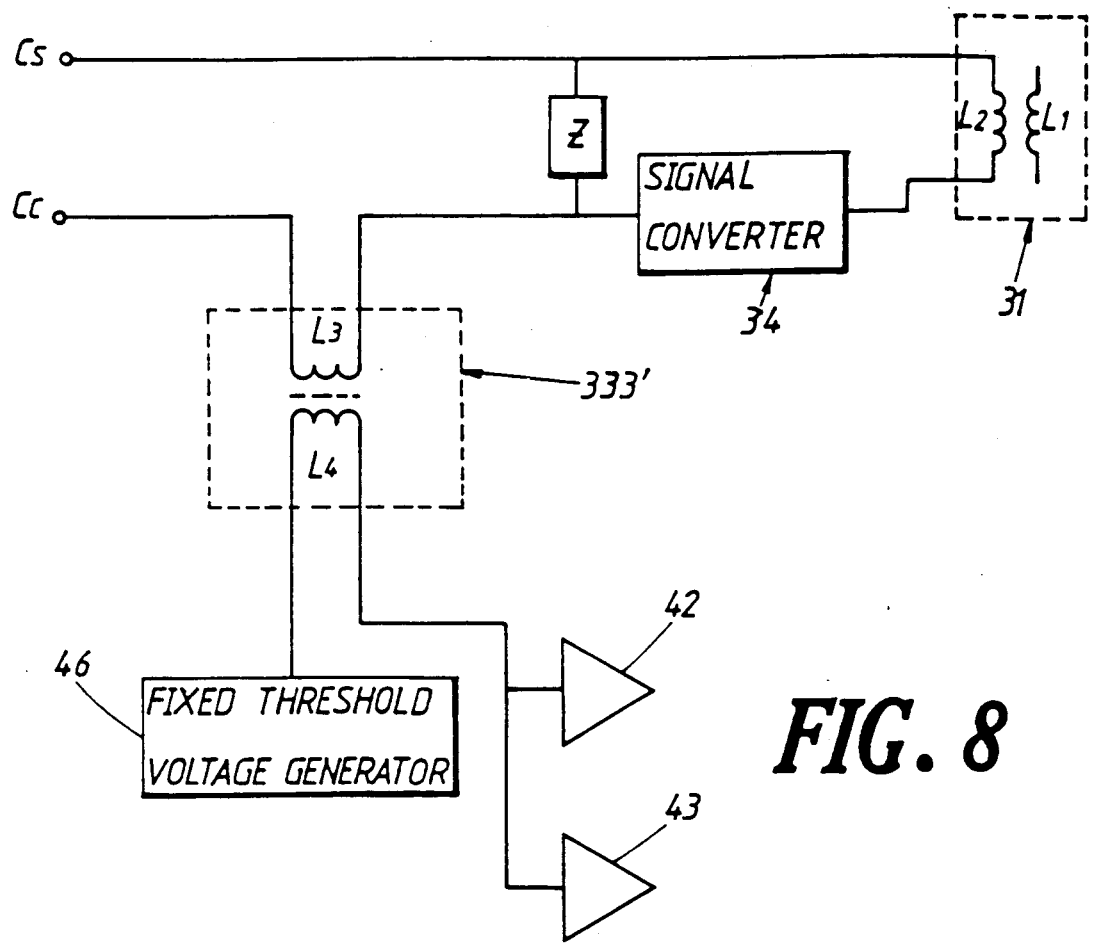
FIG. 8 is a schematic circuit diagram showing an alternative embodiment of an isolation block as shown in FIG. 3-1.

As shown in FIG. 8, the isolation block 333 connected between the signal converter 34 and the terminal cc comprises a transformer 333′ having a third coil L3 and a fourth coil L4 wherein the third coil L3 is connected between the terminal cc and the signal converter 34, and the fourth coil L4 is connected between the input of the fixed threshold voltage generator 46 and the first inputs of both the first and second comparators 42 and 43. An impedance Z is connected between the terminal Cs, and the connection node of the third coil L3 and signal converter 34.

Figure 9:
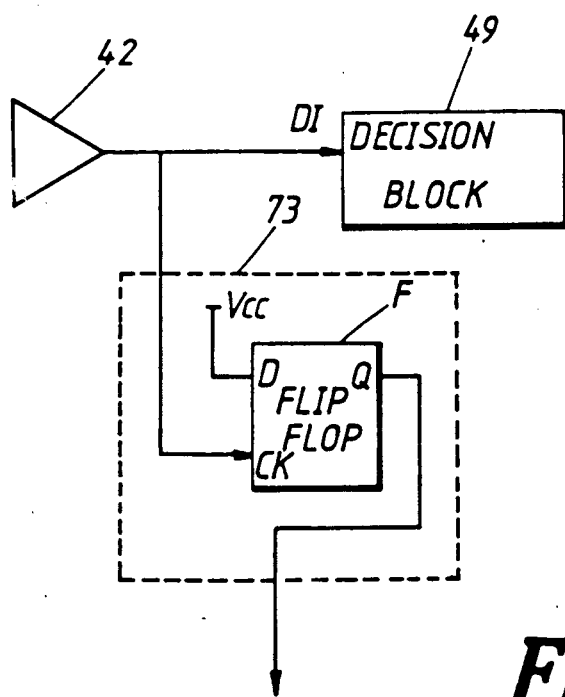
FIG. 9 is a block diagram illustrating an alternative embodiment of a timing circuit as shown in FIG. 3-1.
Figure 10:
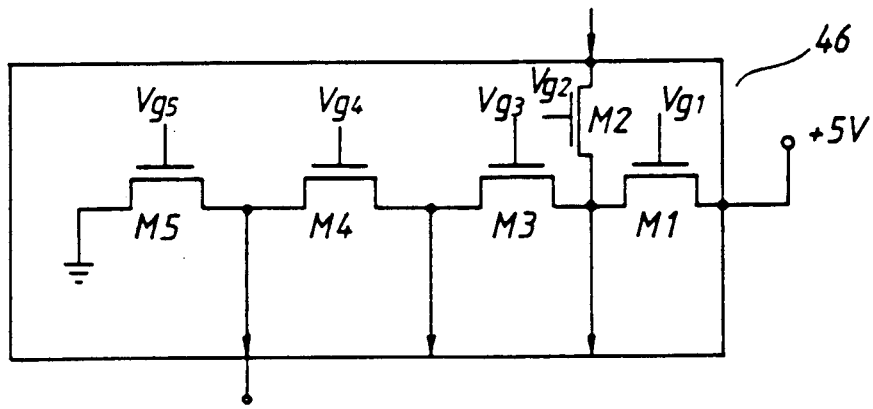
FIG. 10 is a circuit diagram showing an alternative embodiment of a fixed threshold voltage generator as shown in FIG. 3-1.

As shown in FIG. 9, the timing circuit 73 comprises a Flop-Flop f having the data input connected to a power supply Vcc, the clock input connected to the terminal DI of the decision block 49, and the Q output thereof connected both to the third input of the first dynamic threshold voltage generator 47 and to the first input of the second dynamic threshold voltage generator 48. Referring to FIGS. 3-2 and 10, these resistors R51-R55 as shown in FIG. 3-2 may be replaced by MOS transistors of different sizes M1 to M5 with their gates respectively connected to DC voltages Vg1 to Vg5.

Figure 11:
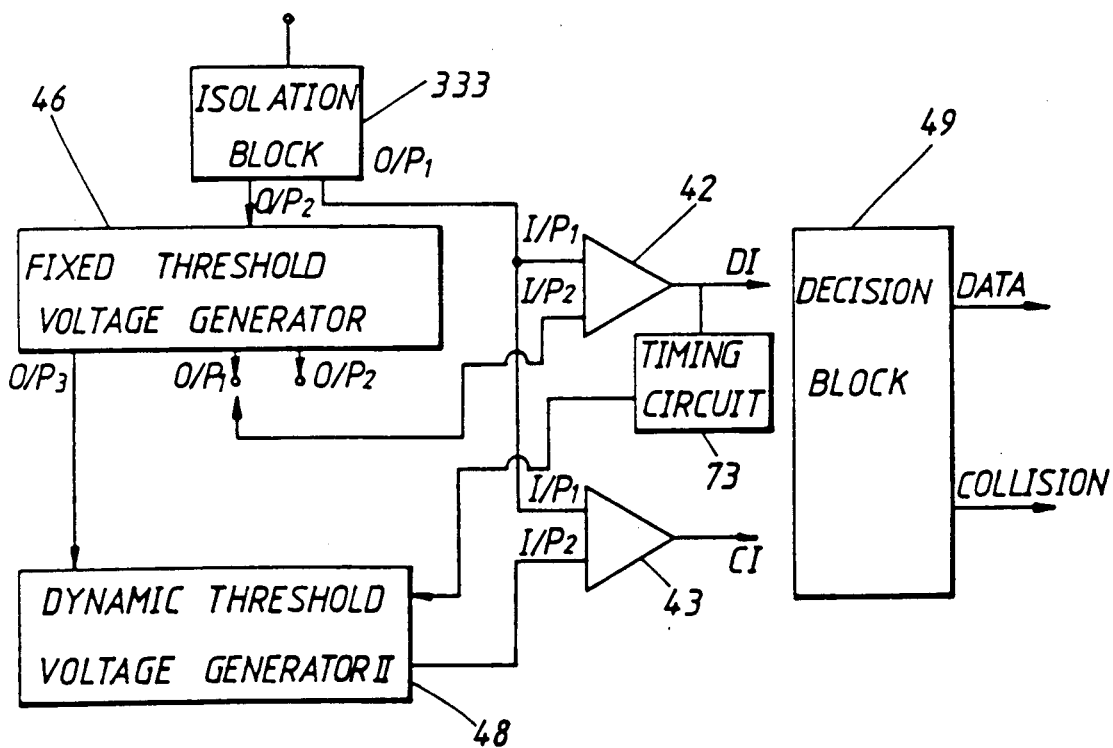
FIG. 11 is a block diagram showing an alternative embodiment of the receiver as shown in FIG. 3-1.
Figure 13:
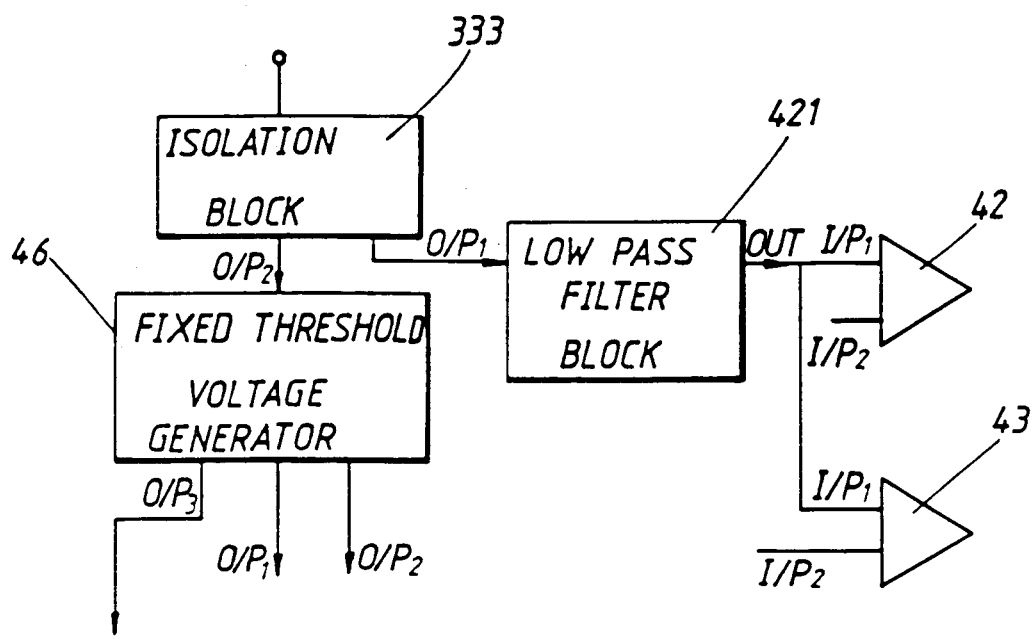
FIG. 13 is a simplified block diagram showing a further embodiment of the receiver as shown in FIG. 3-1.
Figure 14:
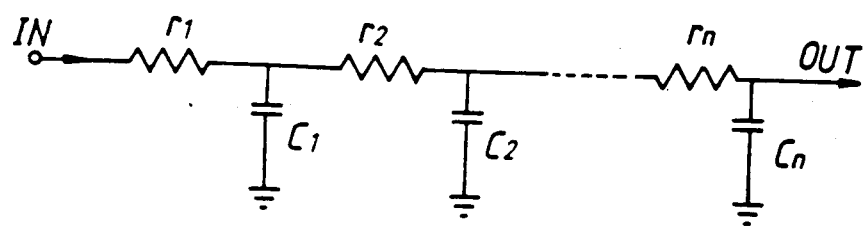
FIG. 14 is a circuit diagram showing a low pass filter which may be used with the receiver as shown in FIG. 13.

Referring to FIGS. 3-1 and 11, the first dynamic threshold voltage generator 47 as shown in FIG. 3-1 can be omitted and alternatively the second input of the first comparator 42 is connected to the second output of the fixed threshold voltage generator 46.

Referring to FIG. 2-1, the signal converter 34 can be replaced by a short circuit to be applicable to the non-IEEE 802.3 environment.

Figure 12:
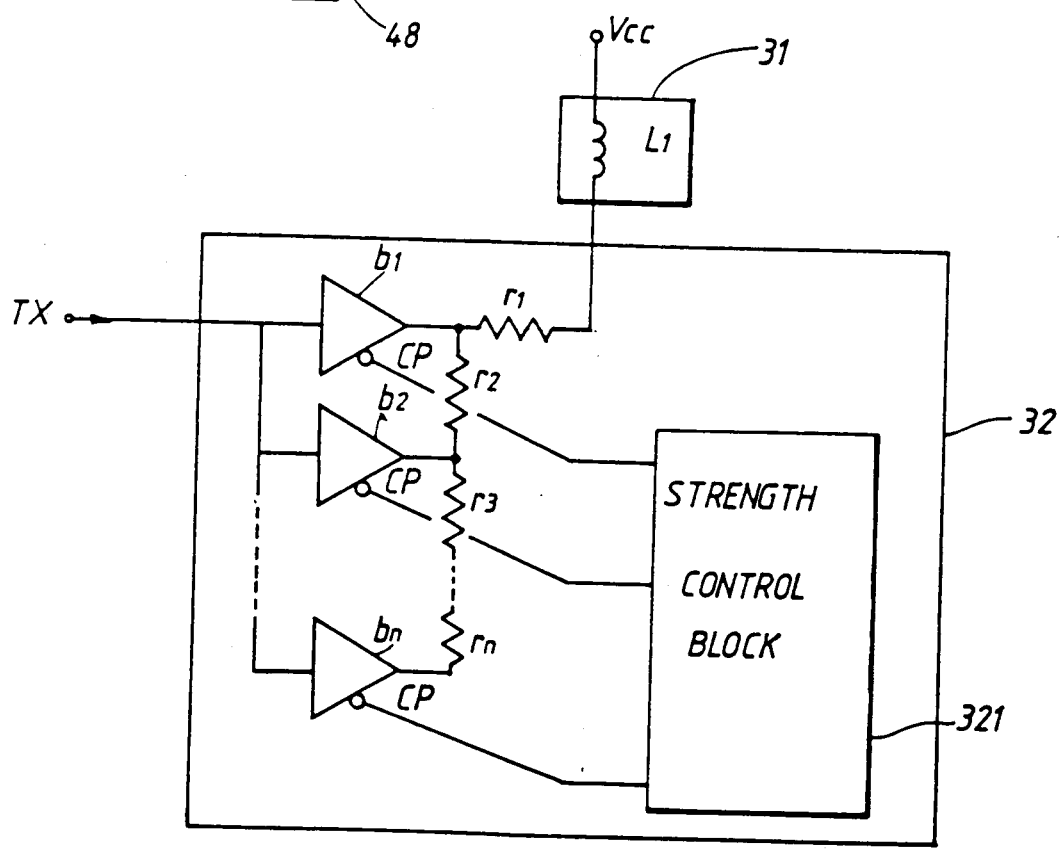
FIG. 12 is a schematic circuit diagram showing a third embodiment of the transmitter as shown in FIG. 6.

Referring to FIG. 12, the transmitter 32 further comprises N tri-state output buffers b1 to bn wherein the output of the first buffer b1 is connected to one end of the first coil L1 of said isolation transformer 31 through a first resistor r1 and the other end of the first coil L1 is connected to a power supply Vcc. The output of the second buffer b2 is connected to the output of the first buffer b1 through a second resistor r2. Similar procedures will be continued until the output of the nth buffer bn is connected to the output of the (n−1) th buffer bn−1 through a nth resistor rn. All of the inputs of buffers b1 to bn are commonly connected to the terminal TX while all of the control pins cp of said buffers b1 to bn are respectively connected to the inputs of a strength control block 321. The strength control block 321 has means to monitor the waveform strength across the terminals cc and cs and accordingly adjust the number of active output buffers so as to maintain a constant waveform strength across said terminals cc and cs.

Referring to FIGS. 3-1, 13 and 14, a low pass filter block 421 may be inserted between the first output O/P1 of the isolation block 333 and the first input I/P1 of the first comparator 42. The low pass filter block 421 comprises n resistors r1 to rn which are connected in series with each other. There are n capacitors c1 to cn each of which is connected between the ground and the output of each of the corresponding resistors r1 to rn.

I claim:

1. An apparatus for transmitting and receiving Manchester coded digital data for IEEE 802.3 Ethernet/Cheapernet type local area network comprising:
   an isolation transformer having a first coil and a second coil, one end of said second coil connected to a first external terminal, one end of said first coil connected to a power supply;
   a signal converter, one end of said signal converter connected to the other end of said second coil and the other end thereof connected to a second external terminal;
   a transmitter having an input connected to a third external terminal and an output connected to the other end of said first coil of said isolation transformer; and
   a receiver including:
   an isolation block having an input, a first output and a second output, said input of said isolation block connected to said second external terminal;
   a first comparator having a first input, a second input and an output, said first input of said first comparator connected to said first output of said isolation block;
   a second comparator having a first input, a second input and an output, said first input of said second comparator connected to said first output of said isolation block;
   a fixed threshold voltage generator having an input connected to said second output of said isolation block, and means for generating three fixed threshold voltages respectively to a first output, a second output and a third output;
   a first dynamic threshold voltage generator having a first input and a second input respectively connected to said first output and second output of said fixed threshold voltage generator, a third input, and means for generating a first dynamic threshold voltage to an output connected to said second input of said first comparator;
   a second dynamic threshold voltage generator having a first input, a second input connected to said third output of said fixed threshold voltage generator and, means for generating a second dynamic threshold voltage to an output connected to said second input of said second comparator;
   a timing circuit having an input connected to said output of said first comparator, and means for generating a time signal to an output connected to both said third input of said first dynamic threshold voltage generator and said first input of said second dynamic threshold voltage generator;
   a decision block having a first input connected to said output of said first comparator, a second input connected to said output of said second comparator, and a first output and a second output.

2. An apparatus as claimed in claim 1 wherein said signal converter comprises a diode having a cathode connected to said other end of said second coil of said isolation transformer and an anode connected to said second external terminal.

3. An apparatus as claimed in claim 1 wherein said fixed threshold voltage generator comprises:
   a first resistor having one end connected to a positive power supply;
   a second resistor having one end connected to the other end of said first resistor and the other end connected to said second output of said isolation block;
   a third resistor having one end connected to said other end of said first resistor;
   a fourth resistor having one end connected to the other end of said third resistor; and
   a fifth resistor being connected between the other end of said fourth resistor and the ground;
   whereby the connection node of said first and second resistors serves as said first output of said fixed threshold voltage generator and the connection node of said third and fourth resistors serves as said second output of said fixed threshold voltage generator and the connection node of said fourth and fifth resistors serves as said third output of said threshold voltage generator.

4. An apparatus as claimed in claim 1 wherein said isolation block comprises a capacitor having one end connected to said input of said isolation block and the other end connected to said first and second output of said isolation block.

5. An apparatus as claimed in claim 1 wherein said first dynamic threshold voltage generator comprises:
- a sixth resistor having one end connected to said second input of said first comparator;
- a first capacitor being connected between said one end of said sixth resistor and the ground;
- a first switch being connected between the other end of said sixth resistor and said first output of said fixed threshold voltage generator; and
- a second switch being connected between said other end of said sixth resistor and said second output of said fixed threshold voltage generator;
- whereby said output of said timing circuit is applied to turn on said first switch and to turn off said second switch, or vice versa.

6. An apparatus as claimed in claim 1 wherein said second dynamic threshold voltage generator comprises:
- a third switch being connected between said second input of said second comparator and the ground;
- a second capacitor being connected in parallel with said third switch;
- a seventh resistor having one end connected to said second input of said second comparator; and
- a fourth switch being connected between the other end of said seventh resistor and said third output of said fixed threshold voltage generator;
- whereby said output of said timing circuit is applied to turn on said third switch and to turn off said fourth switch, or vice versa.

7. An apparatus as claimed in claim 1 wherein said timing circuit comprises a one-shot means having an input and an output respectively connected to said input and output of said timing circuit.

8. An apparatus as claimed in claim 1 wherein said decision block comprises:
- a first counter having a clock input connected to said first input of said decision block, an output connected to said first output of said decision block, and a reset input;
- a first one-shot means having an input connected to said clock input of said first counter and an output connected to said reset input of said first counter;
- a second counter having a clock input connected to said second input of said decision block, an output connected to said second output of said decision block and a reset input; and
- a second one-shot means having an input connected to said clock input of said second counter and an output connected to said reset input of said second counter.

9. An apparatus as claimed in claim 8 wherein said decision block further comprises:
- a pulse width detector having an input connected to said first input of said decision block and an output; and
- an OR gate having a first input connected to said output of said pulse width detector, a second input connected to said output of said second counter and an output connected to said second output of said decision block.

10. An apparatus as claimed in claim 1 wherein said transmitter comprises a bipolar transistor having a base connected to said third external terminal, an emitter connected to the ground and a collector connected to said other end of said first coil of said isolation transformer.

11. An apparatus as claimed in claim 1 wherein said transmitter comprises a MOS transistor having a gate connected to said third external terminal, a source connected to the ground and a drain connected to said other end of said first coil of said isolation transformer.

12. An apparatus as claimed in claim 1 wherein said transmitter comprises:
- M sets of transistors wherein each set consists of N transistors, all of the drains of N transistors being connected to said other end of said first coil of said isolation transformer, all of the sources of N transistors being connected to the ground;
- M chains of delay elements wherein each chain consists of $N-1$ delay elements which are connected in series with each other, each chain of $N-1$ delay elements cooperating with each set of N transistors such that the input of a first delay element of each chain is connected to the gate of a first transistor of each corresponding set and the outputs of $N-1$ delay elements of each chain are sequentially connected to the gates of the second to nth transistors of each corresponding set, and that the input of said first delay element of a first chain is connected to said third external terminal;
- $M-1$ delay components which are connected in series with each other such that the input of a first delay component being connected to the input of said first delay element of a first chain and the outputs of the first to $(M-1)$th delay components are sequentially connected to the inputs of said first delay elements of the second to Mth chains, and that the input of said first delay component is connected to said third external terminal.

13. An apparatus as claimed in claim 12 wherein said transmitter further comprises:
- M switches each having a control pin such that each switch is connected between the input of said first delay element of each chain and the gate of said first transistor of each set;
- $(N-1)$ columns X M rows switches each having a control pin such that each switch is connected between the output of each delay element of each of N chains and the gate of each of the second to nth transistors of each of N sets; and
- $N-1$ flip-flops which are connected in series with each other to form a shift register whereby the input of a first flip-flop is connected both to said third external terminal and to the control pins of all of said M switches and the output of each of said $N-1$ flip-flops is connected to the control pins of all of the switches of the corresponding column.

14. An apparatus as claimed in claim 1 wherein said isolation block comprises a transformer having a third coil and a fourth coil, one end of said third coil being connected to said second external terminal and the other end thereof being connected to said other end of said signal converter, one end of said fourth coil being connected to said input of said fixed threshold voltage generator and the other end thereof being connected both to said first input of said first comparator and to said first input of said second comparator.

15. An apparatus as claimed in claim 1 wherein said timing circuit comprises a flip-flop having a data input connected to a power supply, a clock input connected to said first input of said decision block, and an output connected to said output of said timing circuit.

16. An apparatus as claimed in claim 3 wherein all of said first, second, third, fourth and fifth resistors are replaced by MOS transistors, the gates of which are respectively connected to five DC voltage sources.

17. An apparatus as claimed in claim 1 wherein said second input of said first comparator is directly connected to said second output of said fixed threshold voltage generator.

18. An apparatus as claimed in claim 1 wherein said other end of said second coil of said isolation transformer is directly connected to said second external terminal for the application of the non-IEEE 802.3.

19. An apparatus as claimed in claim 1 wherein said transmitter comprises:
   N tri-state output buffers each having an output connected to an output of the next output buffer through a resistor, a first output buffer having its output connected through a resistor to said other end of said first coil of said isolation transformer, all of the inputs of n output buffers being connected to said input of said transmitter, each output buffer having a control terminal;
   a strength control block having n inputs respectively connected to said control terminals of said N tri-state output buffers, said strength control block having means to monitor the waveform strength across said first and second external terminals and accordingly to adjust the number of the active output buffers whereby a constant waveform strength across said first and second external terminals is maintained.

20. An apparatus as claimed in claim 1 wherein said receiver further comprises a low-pass filter block wherein an output thereof is connected both to said first input of said first comparator and to said first input of said second comparator, and wherein an input thereof is connected to said first output of said isolation block.

21. An apparatus as claimed in claim 20 wherein said low-pass filter block comprises:
   N resistors connected in series with each other; and
   N capacitors each connected between the output of each corresponding resistor and the ground.

* * * * *